(12) United States Patent
Chen et al.

(10) Patent No.: US 10,601,900 B2
(45) Date of Patent: Mar. 24, 2020

(54) SUPPORTING DISTRIBUTED LEDGERS IN A MICRO-SERVICES ENVIRONMENT

(71) Applicant: Red Hat, Inc., Raleigh, NC (US)

(72) Inventors: Huamin Chen, Westboro, MA (US); Jay Vyas, West Concord, MA (US)

(73) Assignee: Red Hat, Inc., Raleigh, NC (US)

( * ) Notice: Subject to any disclaimer, the term of this patent is extended or adjusted under 35 U.S.C. 154(b) by 324 days.

(21) Appl. No.: 15/604,045

(22) Filed: May 24, 2017

(65) Prior Publication Data
US 2018/0343111 A1 Nov. 29, 2018

(51) Int. Cl.
| G06F 21/00 | (2013.01) |
| H04L 29/08 | (2006.01) |
| G06Q 20/06 | (2012.01) |
| G06F 9/455 | (2018.01) |
| H04L 9/32 | (2006.01) |
| G06F 21/60 | (2013.01) |
| G06F 21/64 | (2013.01) |

(52) U.S. Cl.
CPC .............. H04L 67/10 (2013.01); G06F 9/455 (2013.01); G06F 9/45533 (2013.01); G06F 21/60 (2013.01); G06F 21/602 (2013.01); G06F 21/64 (2013.01); G06Q 20/0655 (2013.01); G06Q 20/0658 (2013.01); H04L 9/3239 (2013.01); H04L 67/1008 (2013.01); *G06Q 2220/00* (2013.01); *H04L 2209/38* (2013.01); *H04L 2209/56* (2013.01)

(58) Field of Classification Search
CPC ...... G06F 21/60; G06F 21/602; G06F 21/604; G06F 21/64; G06F 21/645; H04L 9/32; H04L 9/3218; H04L 9/3236
See application file for complete search history.

(56) References Cited

U.S. PATENT DOCUMENTS

| 9,560,081 B1 | 1/2017 | Woolward |
| 2017/0005804 A1 | 1/2017 | Zinder |
| 2017/0034217 A1 | 2/2017 | Anton et al. |

(Continued)

OTHER PUBLICATIONS

Gursimran, "BlockChain App Deployment Using Microservices with Docker", Xenonstack, Dec. 9, 2016, 24 pages, https://www.xenonstack.com/blog/blockchain-apps-deployment-using-microservices-with-docker.

(Continued)

*Primary Examiner* — Edward Zee
(74) *Attorney, Agent, or Firm* — Lowenstein Sandler LLP

(57) ABSTRACT

Implementations of the disclosure provide an apparatus comprises: a memory to store a set of blocks of a distributed ledger; and a processing device, operatively coupled to the memory, to: receive, from a node device, a message comprising a first number of blocks of the distributed ledger that have been processed by the node device. A number of blocks to be skipped are determined. The number is equal to a difference between the first number of blocks and a second number of blocks of the distributed ledger that have been processed by the apparatus. One or more blocks of the determined number of blocks that have been processed by the node device but have not been processed by the apparatus are utilized to update the set of blocks of the distributed ledger. Thereupon, the one or more blocks that are utilized by the apparatus to update the distributed ledger are skipped for processing.

15 Claims, 5 Drawing Sheets

(56) References Cited

U.S. PATENT DOCUMENTS

2017/0054611 A1\* 2/2017 Tiell .................. G06F 16/285
2017/0070504 A1   3/2017 Ramachandran et al.
2017/0075941 A1\* 3/2017 Finlow-Bates ....... H04L 67/104

OTHER PUBLICATIONS

Gursimran, "BlockChain App Deployment Using Microservices with Kubernetes", Xenonstack, Jan. 27, 2017, 28 pages, https://www.xenonstack.com/blog/blockchain-app-deployment-using-microservices-with-kubernetes.

Kruse, "Decentralized Trust: How the Blockchain Could help to Revolutionize Value Transfer", Ericsson, Jan. 16, 2015, 5 pages, https://www.ericsson.com/thinkingahead/the-networked-society-blog/2015/01/16/decentralized-trust-how-the-blockchain-could-help-to-revolutionize-value-transfer/.

"Awesome-Microservices : A Curated List of Microservice Architecture Related Principles and Technologies" Github, accessed May 24, 2017, 16 pages, https://github.com/mfornos/awesome-microservices.

"Machine Learning Microservice for Blockchain Optimized Social Media Disruption", Steemit, accessed May 24, 2017, 3 pages, https://steemit.com/anarchism/@frigginglorious/machine-learning-microservice-for-blockchain-optimized-social-media-disruption.

Featherston, "Blockchain as a Service: The New Weapon in the Cloud Wars?", Dzone, Jun. 10, 2016, 5 pages, https://dzone.com/articles/blockchain-as-a-service-the-new-weapon-in-the-clou.

\* cited by examiner

```
400
```

Receive
a message from a node device comprising a first number of blocks of a distributed ledger that have been processed by the node device
410

Determine
a number of blocks to be skipped, wherein the number is equal to a difference between the first number of blocks and a second number of blocks of the distributed ledger that have been processed by an apparatus
420

Utilize
one or more blocks of the determined number of blocks that have been processed by the node device but have not been processed by the apparatus to update the set of blocks of the distributed ledger
430

Skip
the one or more blocks that are utilized by the apparatus for processing
440

FIG. 4

SUPPORTING DISTRIBUTED LEDGERS IN A MICRO-SERVICES ENVIRONMENT

TECHNICAL FIELD

The implementations of the disclosure relate generally to computing infrastructures and, more specifically, relate to supporting distributed ledgers in a micro-services environment.

BACKGROUND

Employing micro-services allows breaking down complex applications into relatively simple independent processes, thus producing highly decoupled systems. Each system may include multiple applications that are hosted on a provider's infrastructure. Each process associated with the services is focusing on doing a relatively simple task to support the applications for each individual customer.

BRIEF DESCRIPTION OF THE DRAWINGS

The disclosure can be understood more fully from the detailed description given below and from the accompanying drawings of various implementations of the disclosure. The drawings, however, should not be taken to limit the disclosure to the specific implementations, but are for explanation and understanding only.

The disclosure is illustrated by way of examples, and not by way of limitation, and may be more fully understood with references to the following detailed description when considered in connection with the figures, in which:

FIG. 4 illustrates a flow diagram of a method to support distributed ledgers in a micro-services environment according to an implementation of the disclosure.

DETAILED DESCRIPTION

Figure 1:
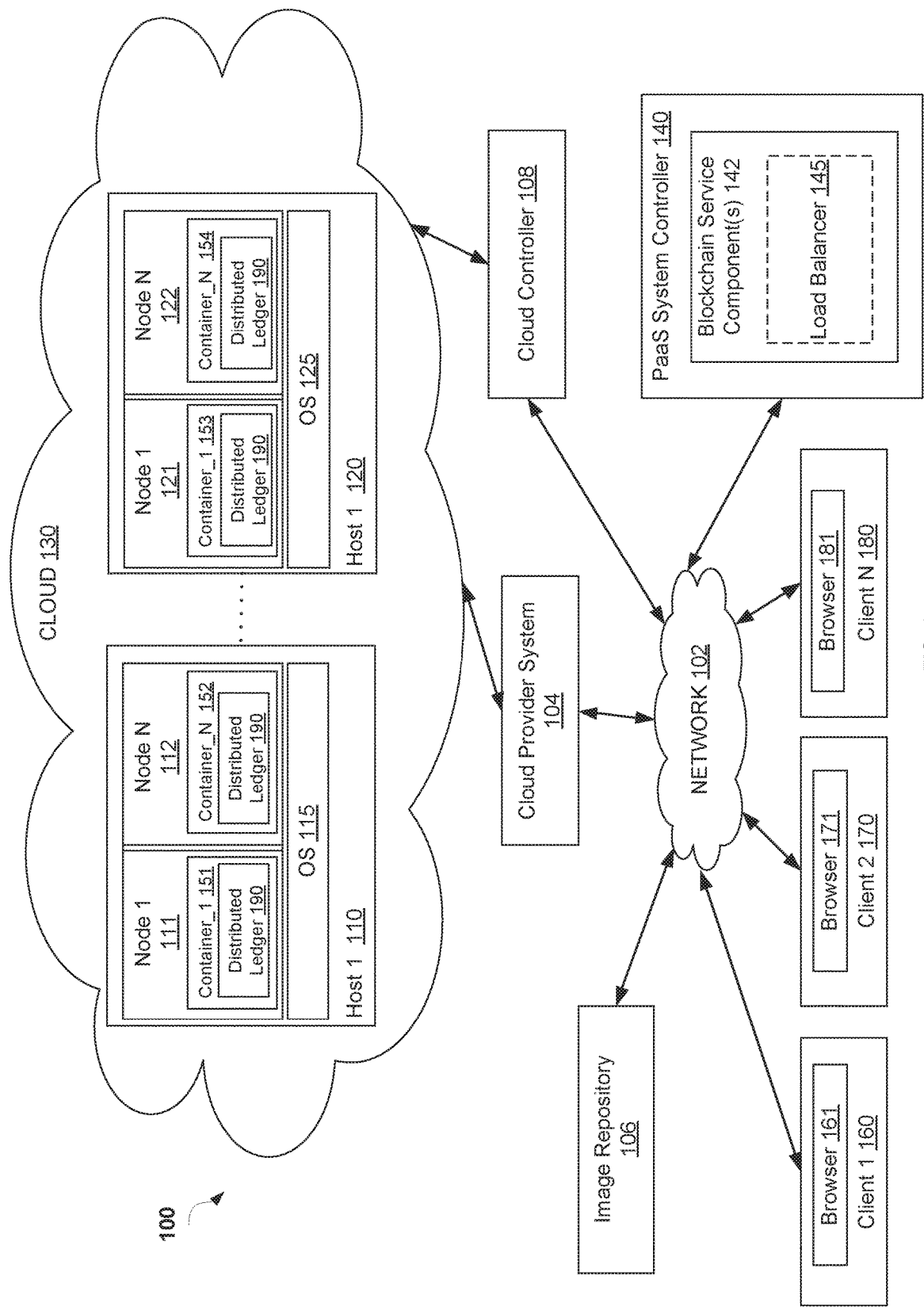
FIG. 1 is a block diagram of a network architecture in which implementations of the disclosure may operate.

A micro-service is an independently deployable modular service that communicates with other services in a system (e.g., a cloud-based system) through a lightweight interface. These micro-services may be executed in containers to create containerized applications. A "container" herein shall refer to an interface between a host machine and a software application. The software application may comprise one or more related processes and may provide a certain service (e.g., an HTTP server, a database server, etc.). Containerization is an operating-system-level virtualization environment of a host machine that provides a way to isolate the micro-service processes. At the same time, employing the containers makes it possible to develop and deploy new cloud-based micro-services in a cloud-based system.

In some situations, the micro-services may be employed to help customers build applications that combine the capabilities of a distributed ledger in a cloud-based system. A "distributed ledger" is a decentralized database that is spread across multiple (also geographically dispersed) sites. The distributed ledger eliminates the need for a central authentication authority by transferring authority and trust to a virtual network of nodes in the cloud-based system. Each node can sequentially record transactions in a public "block" (e.g., a data structure) of data by creating a unique "chain" also referred to a blockchain.

A "blockchain" is one type of distributed ledger that is used, for example, in a Bitcoin crypto-currency system. The blockchain is a data structure comprising a complete history of each block in the network from the first block to the most recently added block. Blocks of the blockchain behave like containers with data (e.g., transactions) in blocks that are connected to other blocks in the blockchain. The blocks are "immutable" in that they cannot be changed. Each node of the network maintains a copy of the blockchain upon joining the network. Blocks of data are then processed by each node or otherwise added to the blockchain in a linear order. When the nodes are processing the blocks, the nodes link each block of data to a previous block in their copy of the blockchain, using a cryptographic fingerprint, such as a hash function.

Blocks are stored one after the other in the blockchain, but each block can only be added when all of the nodes reach a quorum (consensus) regarding rules about what new data blocks can be added. To reach the quorum, the nodes of the network may transmit messages between each other regarding transactions for new block additions that are happening to one another. To link the blocks, each node generates the cryptographic fingerprint by using a hash function that turns the block's data into a fingerprint of that data also referred to a hash value. The nodes then successively build blocks that include a reference (e.g., a data pointer) to the hash value of the previous block in the blockchain. As such, the blocks of the blockchain are explicitly ordered by reference to the previous block's hash value, which reflects the content of that previous block. The hash values are used to secure (by cryptography) the authentication of the block data and the source associated with each block in the blockchain, which removes the need for the central authentication authority.

There are, however, several issues that can occur when using a distributed ledger in a cloud-based micro-services type system. For instance, some nodes of the cloud-based system may be installed at various geographically dispersed sites. In such cases, inconsistences can occur across the various nodes if certain nodes fall behind in their processing of blocks due to limited capabilities or local performance/network issues. Moreover, due to the amount of blocks that may be generated for the ledger, numerous messages may be transmitted between all the nodes every time a new block is added. This communication between the geographically dispersed nodes can lead to inefficiencies that may adversely affect network bandwidth and severely impact system performance.

Implementations of the disclosure address the above-mentioned and other deficiencies by using the immutable properties of the blockchain to ensure a highly available and maximally consistent distributed ledger in a micro-services environment. The micro-services environment, in implementations, may execute a load balancer service that allows certain nodes that have fallen behind in their processing of blocks of the distributed ledger to receive a portion of the ledger from another node in the network. For example, if a first node in the network has only processed 50% of the ledger and another node has processed 75% of the ledger, the first node may receive the difference portion of the ledger from the second node so that the first node can catch up.

In some implementations, the load balancer service may forward block requests to other nodes in the network that are more advanced in processing blocks of the ledger. For example, the load balancer service can issue a request to nodes of the network for state information regarding their processing of blocks for the ledger. Based on the state information, the load balancer service can monitor the block processing rate for all of the nodes in the network and determines which node is most advanced in its processing of the blocks. For example, the load balancer service determines if the size of the ledger associated with a certain node meets a particular threshold amount higher than other nodes in the network.

After determining which node is most advanced in its processing of the blocks for the ledger, the load balancer service copies a number of blocks from that particular node to a second node that has falling behind. The copied blocks can be added to the ledger of the second node because the blocks are unable to be changed due to the immutable properties of the blockchain. Hence, any node in the network can be assured that the data in the blocks are verifiable once a particular node has processed them. The copied blocks then become a new starting point for the second node to start processing new blocks of the ledger. Thus, an advantage of the load balancer service it that is helps nodes to update and repair their copy of the ledger by allowing the node to "skip ahead" of their processing backlog, rather than forcing a dependency on the network and system capabilities.

FIG. 1 is a block diagram of a network architecture 100 in which implementations of the disclosure may operate. In some implementations, the network architecture 100 may be used in a Platform-as-a-Service (PaaS) system, such as OpenShift®. The PaaS system provides resources and services (e.g., micro-services) for the development and execution of applications owned or managed by multiple users. A PaaS system provides a platform and environment that allow users to build applications and services in a clustered compute environment (the "cloud") Although implementations of the disclosure are described in accordance with a certain type of system, this should not be considered as limiting the scope or usefulness of the features of the disclosure. For example, the features and techniques described herein can be used with other types of multi-tenant systems.

As shown in FIG. 1, the network architecture 100 includes a cloud-computing environment 130 (also referred to herein as a cloud) that includes nodes 111, 112, 121, 122 to execute applications and/or processes associated with the applications. A "node" providing computing functionality may provide the execution environment for an application of the PaaS system. In some implementations, the "node" may refer to a virtual machine (VM) that is hosted on a physical machine, such as host 1 110 through host N 120, implemented as part of the cloud 130. In some implementations, the host machines 110, 120 are often located in a data center. For example, nodes 111 and 112 are hosted on physical machine 110 in cloud 130 provided by cloud provider 104. In some implementations, an environment other than a VM may be used to execute functionality of the PaaS applications. When nodes 111, 112, 121, 122 are implemented as VMs, they may be executed by operating systems (OS s) 115, 125 on each host machine 110, 120.

In some implementations, the host machines 110, 120 are often located in a data center. Users can interact with applications executing on the cloud-based nodes 111, 112, 121, 122 using client computer systems, such as clients 160, 170 and 180, via corresponding web browser applications 161, 171 and 181. In other implementations, the applications may be hosted directly on hosts 1 through N 110, 120 without the use of VMs (e.g., a "bare metal" implementation), and in such an implementation, the hosts themselves are referred to as "nodes".

Clients 160, 170, and 180 are connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from PaaS system controller 140. In view of these commands, the cloud controller 108 provides data (e.g., such as pre-generated images) associated with different applications to the cloud provider system 104. In some implementations, the data may be provided to the cloud provider 104 and stored in an image repository 106, in an image repository (not shown) located on each host 110, 120, or in an image repository (not shown) located on each node 111, 112, 121, 122. This data may be used for the execution of applications for a multi-tenant PaaS system managed by the PaaS provider controller 140.

In one implementation, the data used for execution of containers 151, 152, 153, 154 that include application images built from pre-existing application components and source code of users managing the application. As discussed above, an image refers to data representing executables and files of the application used to deploy functionality for a runtime instance of the application. In one implementation, the image can be built using a Docker™ tool and is referred to as a Docker image. In other implementations, the application images can be built using other types of containerization technologies. A container 151, 152, 153, 154 is a secure process space on the nodes 111, 112, 121 and 122 to execute functionality of an application. In some implementations, a container is established at the nodes 111, 112, 121 and 122 with access to certain resources of the underlying node, including memory, storage, and one or more distributed ledgers 180. In one implementation, the containers 151, 152, 153, 154 may be established using the Linux Containers (LXC) method. In further implementations, containers 151, 152, 153, 154 may also be established using cgroups, SELinux™, and kernel namespaces, to name a few examples.

In some implementations, the network 100 may implement a distributed ledger 190. The distributed ledger 190 is a decentralized database that is spread across geographically dispersed sites. The distributed ledger 190, in implementations, may be a blockchain. A blockchain is a type of distributed ledger that is used, for example, in a Bitcoin crypto-currency system. The blockchain is a data structure comprising a complete history of each block in the network 100 from the first block to the most recently added block. Each node 111, 112, 121, 122 that is part of the blockchain keeps a copy of all or a portion of the blockchain (e.g., distributed ledger 190) in storage (e.g., on disk or in RAM) that is local to that node. For example, each node 111, 112, 121, 122 may receive a copy of the distributed ledger 190 upon joining the network 100.

The distributed ledger 190 may be a public ledger that includes many different individual computer systems that are operated by different entities that maintain a single blockchain. In alternative implementations, distributed ledger 190 may include one or more individual computer systems that are all operated by a single entity (e.g., a private or closed system). In certain implementations, the entity that operates network 100 may also operate nodes 111, 112, 121, 122 (or a portion thereof) and the ledger 190 that is maintained by those nodes.

The nodes 111, 112, 121, 122 can sequentially record data (e.g., transactions) into the distributed ledger 190 as blocks of data. For example, each of the nodes 111, 112, 121, 122 operated to "process" blocks of the ledger by validating data (e.g., transactions) associated with each block. Generally, only one of the nodes needs to receive the data that has been submitted from a client, such as clients 160, 170, 180. Once one node receives the data, it may propagate that data to other participating nodes within the network 100 so that it can be added to their copy of the distributed ledger 190.

To validate a new block that is to be consumed into the distributed ledger 190, the nodes 111, 112, 121, 122 perform a hash operation that includes solving a computationally difficult problem that is also easy to verify. For example, each node may attempt to compute a hash value for a block of data using a cryptographic hash function. The input to the hash function may include the data associated with a block and the output is a hash value that represents the data (e.g., transactions) of the block. The nodes 111, 112, 121, 122 then successively build blocks that include a reference (e.g., a data pointer) to the hash value of the previous block in the ledger 190. As such, the blocks of the ledger 190 are explicitly ordered by reference to the previous block's hash value, which reflects the content of that previous block.

In some implementation, the PaaS system of network 100 may include one or more blockchain service components 142 that are installed to support micro-services for the distributed ledger 190. One such service includes a load balancer 145 to ensure highly available and maximally consistent distributed ledgers 190 across the nodes 111, 112, 121, 122 in the network 100. For example, a load balancer 145 allows certain nodes that may have fallen behind in their processing of blocks of the distributed ledger 190 to receive a portion of that ledger from another node in the network 100. For example, if a first node in the network 100 has only processed 50% of the ledger 190 and another node has processed 75% of the ledger 190, the first node may receive the difference portion of the ledger 190 from the second node so that the first node can catch up.

While various implementations are described in terms of the environment described above, the facility may be implemented in a variety of other environments including a single, monolithic computer system, as well as various other combinations of computer systems or similar devices connected in various ways. For example, the load balancer 145 may be running on a node, such as nodes 111, 112, 121, 122, of the PaaS system of network 100 hosted by cloud 130, or may execute external to cloud 130 on a separate server device. In some implementations, the load balancer 145 may include more components that what is shown that operate in conjunction with the PaaS system of network 100.

Figure 2:
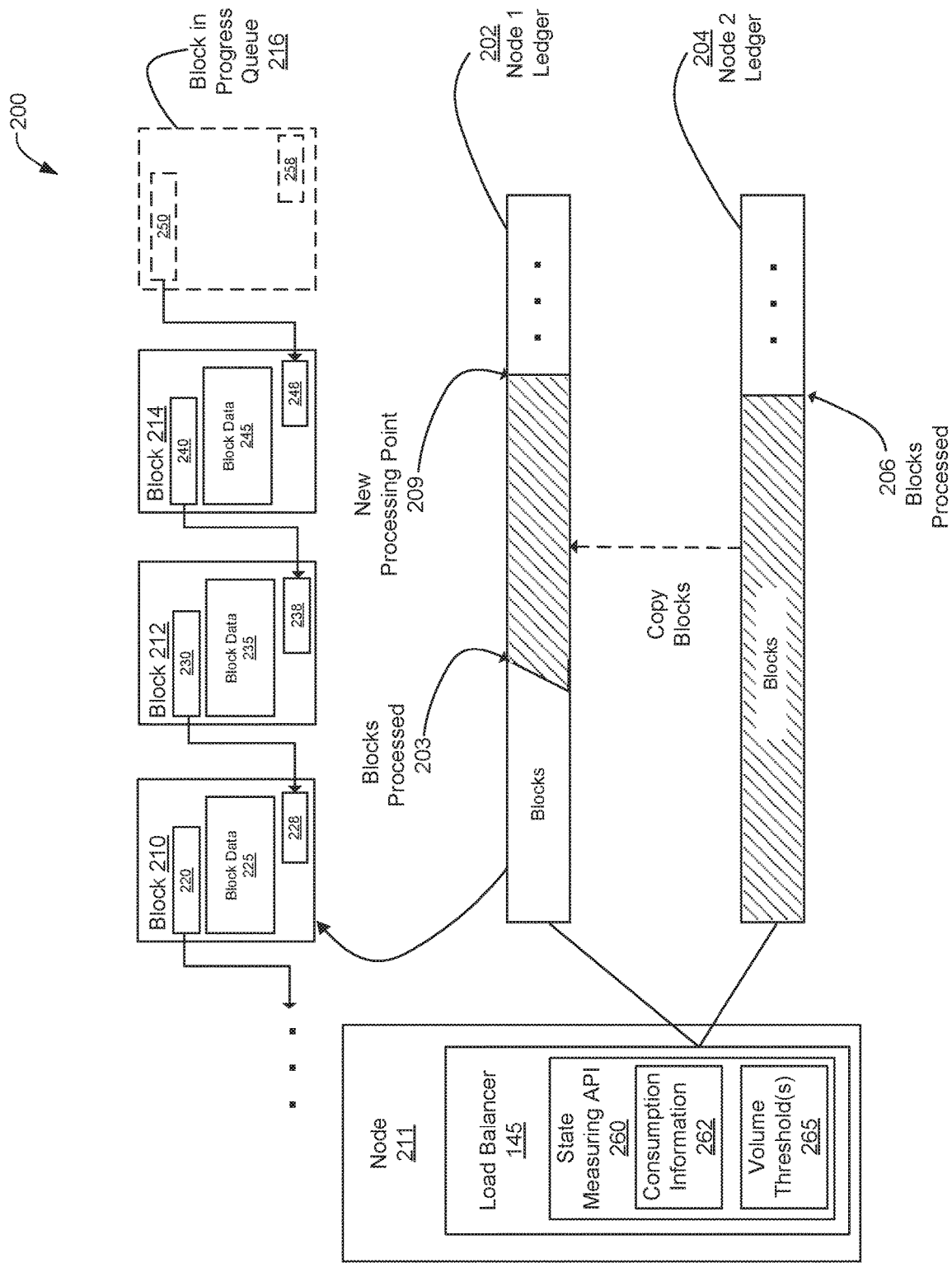
FIG. 2 is a block diagram of a system including data structures to support distributed ledgers in a micro-services environment according to an implementation of the disclosure.

FIG. 2 is a block diagram of a system 200 including data structures 202 and 204 to support distributed ledgers, such as distributed ledger 190, in a micro-services environment according to an implementation of the disclosure. In this example, system 200 (which may be the PaaS system of network 100 of FIG. 1) includes node 211 (which may be the same as Node 111 of FIG. 1). In this example, node 211 includes the load balancer 145 of FIG. 1 for ensuring consistency of the distributed ledgers across the nodes of the system 200.

In some implementations, node 211 maintains a copy of all or a portion of the distributed ledger 190 as a data structure 202 in storage (e.g., on disk or in RAM) local to that node. In one implementation, the data structures 202 and 204 are each a blockchain, which is a type of distributed ledger. Each (blockchain) of the data structures, such data structure 202, includes a plurality of blocks (e.g., block 210-214), and includes a complete history from a first block in the chain to the most recently added block. The blocks 210-214 are "immutable" in that they cannot be changed. Each of the blocks 210-214 behave like a container comprising block data 225,235,245 (e.g., transactions) placed inside. Each block of the data structure 202 is connected to other blocks in the chain. In that regard, the blocks include a hash value 220, 230, 240 that points to a hash value 228, 238, 248 in a previous block. For example, block 212 includes hash value 230 that points to hash value 228 of block 210 and block 214 includes hash value 240 that points to hash value 238 of block 212.

Each node, such as node 211, may include a queue of blocks are to be processed or otherwise added to the data structure 202 stored locally at that node. The blocks that are processed by the node are added the blockchain in a liner order. For example, block 216 in FIG. 2 depicts a block in the process of being processed by node 211 into data structure 202. To consume block 216, node 211 generates cryptographic have value 258 by using a hash function that turns the block's data into a fingerprint of that data. The node 211 also includes in the block 216 a hash value 250 that points to the previous block 214's hash value 248.

Generally, only one of the nodes needs to receive the block data 225, 235, 245 that has been submitted, for example, from a client. Once one node receives the block data, it may propagate that data to other participating nodes so that it can be added to their copy of the blockchain. If a certain node falls behind in their processing of blocks due to limited capabilities or local performance/network issues, inconsistences can occur across the various nodes of system 200. In such cases, load balancer 145 allows the node that has fallen behind in their processing of blocks to receive a portion that have been processed by another node that is further ahead in consuming blocks.

To locate a node that is further ahead in processing blocks, the load balancer 145 may include a state measuring application programing interface (API) 260. The state measuring API 260 may operate in conjunction with system services such as a Representational State Transfer (REST) API that is used on resources for a particular service where a request for services acts independent of any other request and contains all necessary information to complete the request. In that regard, the state measuring API 260 may transmit a request from other nodes in system 200 for consumption information 262 indicating the amount of blocks consumed by each of the nodes. In response, each node may publish a message comprising a number of blocks consumed by that node, such as indication 203 of the blocks consumed node 1 and indication 206 of the blocks consumed node 2. In alternative implementations, each node may be configured to publish this consumption information 262 at a certain frequency of times rather having to respond to a request for the information.

The state measuring API 260 selects at least one of the nodes in view of the consumption information 262 based on which node has a higher percentage volume size of the blockchain that is up-to-date. In some implementations, the state measuring API 260 may determine whether the volume size of a particular node meets one or more configurable volume thresholds 265. For example, the state measuring API 260 may select one or more nodes that have processed at least 50% more of the blockchain than node 211. If more than one node is identified, the state measuring API 260 may then determine and select the node that has processed a greater number of blocks of the blockchain than any other node. This ensures that the node most advanced in their processing of the blockchain is selected as a baseline for the node that has fallen behind.

After determining which node is most advanced in its processing of the blocks based on the consumption information 262, the load balancer 145 then copies a number of blocks from that particular node. In that regard, the load balancer 145 using the consumption information 262 from the nodes to determine a difference amount between number of blocks processed by Node 211 and a second node. For example, the load balancer 145 may determine a difference amount between the indication 203 of the blocks processed by node 1 ledger 202 and the indication 206 of the blocks processed by Node 2 ledger 204.

The load balancer 145 then send a request to node associated with Node 2 ledger 204 to copy the block between indication 203 and indication 204. These blocks copied from node 2 ledger 204 can be added to node 1 ledger 202 because the blocks are unable to be changed due to the immutable properties of the blockchain. Hence, any node in system 200 can be assured that the data in the blocks are verifiable once a particular node has processed them. The copied blocks then become a new processing point 209 for node 211 to start processing new blocks for ledger 202. Thus, node 211 has skip ahead of its backlog and its ledger 202 is consistence with the most advanced node in the system 200.

Figure 3:
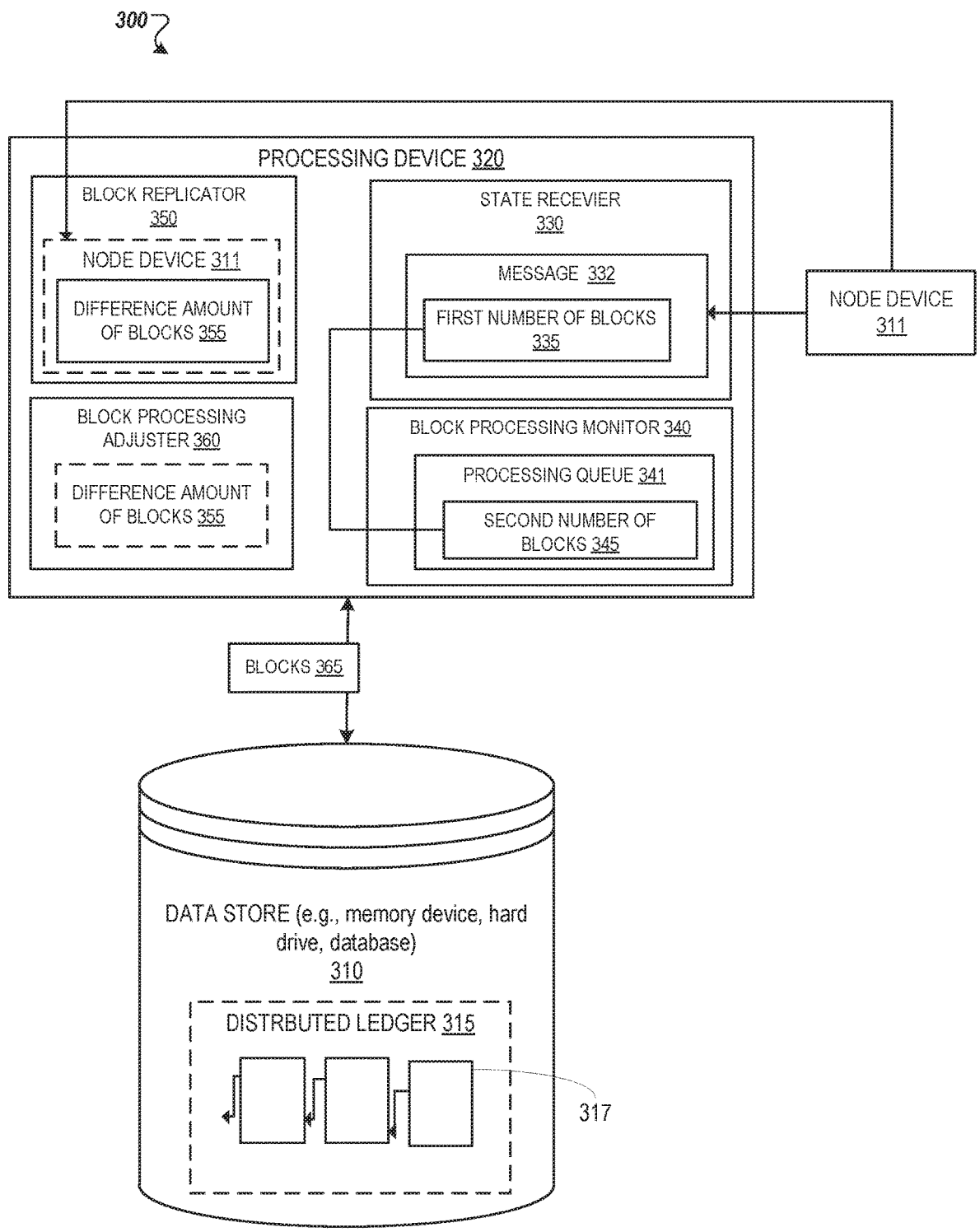
FIG. 3 illustrates a block diagram of an apparatus including memory for supporting distributed ledgers in a micro-services environment according to an implementation of the disclosure.

FIG. 3 is a block diagram of an apparatus 300 including a memory 310 according to an implementation of the disclosure. The apparatus 300 may be the same or similar to a components within the network architecture 100 of FIG. 1. In some implementations, the apparatus 200 may be installed in node device, such as any one of the nodes 111, 112, 121, 122 of network 100. Apparatus 200 may include components to support distributed ledgers in a micro-services environment. In some implementations, the apparatus 300 may include a data store 310 and a processing device 320 coupled to the data store 310. In some implementations, the processing device 320 may execute instructions for carrying out the operations of the apparatus 300 as discussed herein. As shown, the apparatus 300 may execute instructions for a state receiver 330, a block processing monitor 340, a block replicator 350 and a block processing adjuster 360 to adjust a processing point of blocks processed by the apparatus 300 for the distributed ledger 315.

Data store 310 may include any non-persistent data storage (e.g., memory), persistent and/or volatile data storage (e.g., flash storage, hard drive, tape), other medium, or combination thereof that is capable of storing instructions for carrying out the operations of the apparatus 300 discussed herein. In some implementations, the data store 310 may store a distributed ledger 315 that is implemented by the apparatus 200 in conjunction with a plurality of node devices, such as nodes 111, 112, 121, 122 of network 100 of FIG. 1.

In one implementation, the distributed ledger 315 is a blockchain used, for example, in a Bitcoin crypto-currency system. In some implementations, the blockchain is a data structures includes a plurality of blocks 317. The blocks 317 include a complete history for the blockchain from a first block in the chain to the most recently added block. The blocks 317 are "immutable" in that once they are saved in the data store 310 they are unable to be changed. To add a new block to the ledger 315, apparatus 300 consumes the new blocks of data to be added to the blockchain in a liner order. When the apparatus 300 is consuming the blocks, it links each new block of data to a previous block in the blocks 317 stored data store 310, by using a cryptographic fingerprint, such as a hash value. In some situations, the apparatus 300 may fall behind in its consumption of blocks due to limited capabilities or local performance/network issues which may create a backlog of blocks to add to the ledger 315. In such cases, the apparatus 300 may select a local node device, such as node device 311, to copy over blocks that were consumed by that node in order for the apparatus 300 to skip ahead of the backlog.

In operation of the apparatus 300, the state receiver 330 receives a message 332 comprising a first number of blocks 335 of distributed ledger 315 that have been processed by the node device 311. To process the first number of blocks 335, the node device 311 generates the cryptographic fingerprint by using a hash function that turns the block's data into a fingerprint of that data also referred to a hash value. The node device 311 then successively builds blocks that include a reference (e.g., a data pointer) to the hash value of the previous block in the distributed ledger 315 and stores these blocks in its local memory. In some implementations, the node device 311 may publish the message 332 in response to receiving a request for information regarding the number of blocks it has already processed. In alternative implementations, the node device 311 may publish the message 332 periodically or at a determined frequency.

The block processing monitor 340 may monitor the processing rate of a second number of blocks 345 of the distributed ledger 315 that have been processed by the apparatus 200. The block processing monitor 340 then determines a number of blocks 355 to be skipped from processing for the distributed ledger 315. This number is equal to a difference between the first number of blocks 335 and the second number of blocks 345 of the distributed ledger 315 that have been processed by the apparatus 300. For example, if the apparatus has consumed 50% of the ledger 315 and the node device 311 has consumed 75% the difference amount would be 25% of the volume size of the ledger 315 based, respectively, on the first and second number of blocks that have already been consumed.

The block replicator 350 identifies a determined number (difference amount) of blocks 355 associated with the node device 311 to utilize to update the set of blocks 317 of the distributed ledger 315 stored locally at the apparatus 300. For example, the determined number of blocks 355 may correspond to the amount of block the node device 311 is ahead of the apparatus 300 in processing blocks of the ledger 315. The block replicator 350 may determine which blocks 355 of the node device 311 are needed to catch up by determining a first consumption point of the apparatus 300 with respect to the ledger 315 and a second consumption point of node device 311 with respect to the ledger 315. Then, the block replicator 350 may identify that the blocks 355 between the first consumption point and the second consumption point should be requested from the node device 311.

In some implementations, the block replicator 350 sends a request to node device 311 to copy the blocks between the first and second consumption points. These one or more of these blocks 365 copied from node device 311 are then appended to the blocks 317 in data store 110. The copied blocks 365 can be appended to the blocks 317 in data store 110 because the blocks are unable to be changed due to the immutable properties of the blockchain. In this regard, the apparatus 300 can be assured that the data in the blocks are verifiable once the node device 311 has consumed them.

Thereupon, the block processing adjuster 360 skips processing the one or more blocks 365 that is utilized by the apparatus 200. For example, the block processing adjuster 360 causes the apparatus 300 to skip generating a hash value for block data of the one or more blocks 365 that are copied from node device 311. These copied blocks 365 then become a new processing point for the apparatus 300 to start consuming new blocks for the distribute ledger 315. Thus, the apparatus 300 has skipped ahead of its backlog and its ledger 315 is consistent with the more advanced node device 311 in the system.

FIG. 4 illustrates a flow diagram of a method 400 to support distributed ledgers in a micro-services environment according to an implementation of the disclosure. In one implementation, the processing device 320 apparatus 300 of FIG. 3 as directed by the load balancer 145 of FIGS. 1 and 2 may perform method 400. The method 400 may be performed by processing logic that may comprise hardware (circuitry, dedicated logic, etc.), software (e.g., software executed by a general purpose computer system or a dedicated machine), or a combination of both. In alternative implementations, some or all of the method 400 may be performed by other components of a PaaS system. It should be noted that blocks depicted in FIG. 4 can be performed simultaneously or in a different order than that depicted.

Referring to FIG. 4, at block 410, method 400 receives, from a node device 311, a message 322 comprising a first number of blocks 335 of a distributed ledger 315 that have been processed by the node device 311. A number of blocks 355 to be skipped are determined in block 420. This number 355 is equal to a difference between the first number of blocks 335 and a second number of blocks 345 of the distributed ledger that have been processed by an apparatus 300. In block 430, one or more blocks 365 of the determined number of blocks 355 that have been processed by the node device 311 but have not been processed by the apparatus 300 are utilized to update the set of blocks 317 of the distributed ledger 315. In block 440, the one or more blocks 365 that are utilized by the apparatus 300 are skipped for processing.

Figure 5:
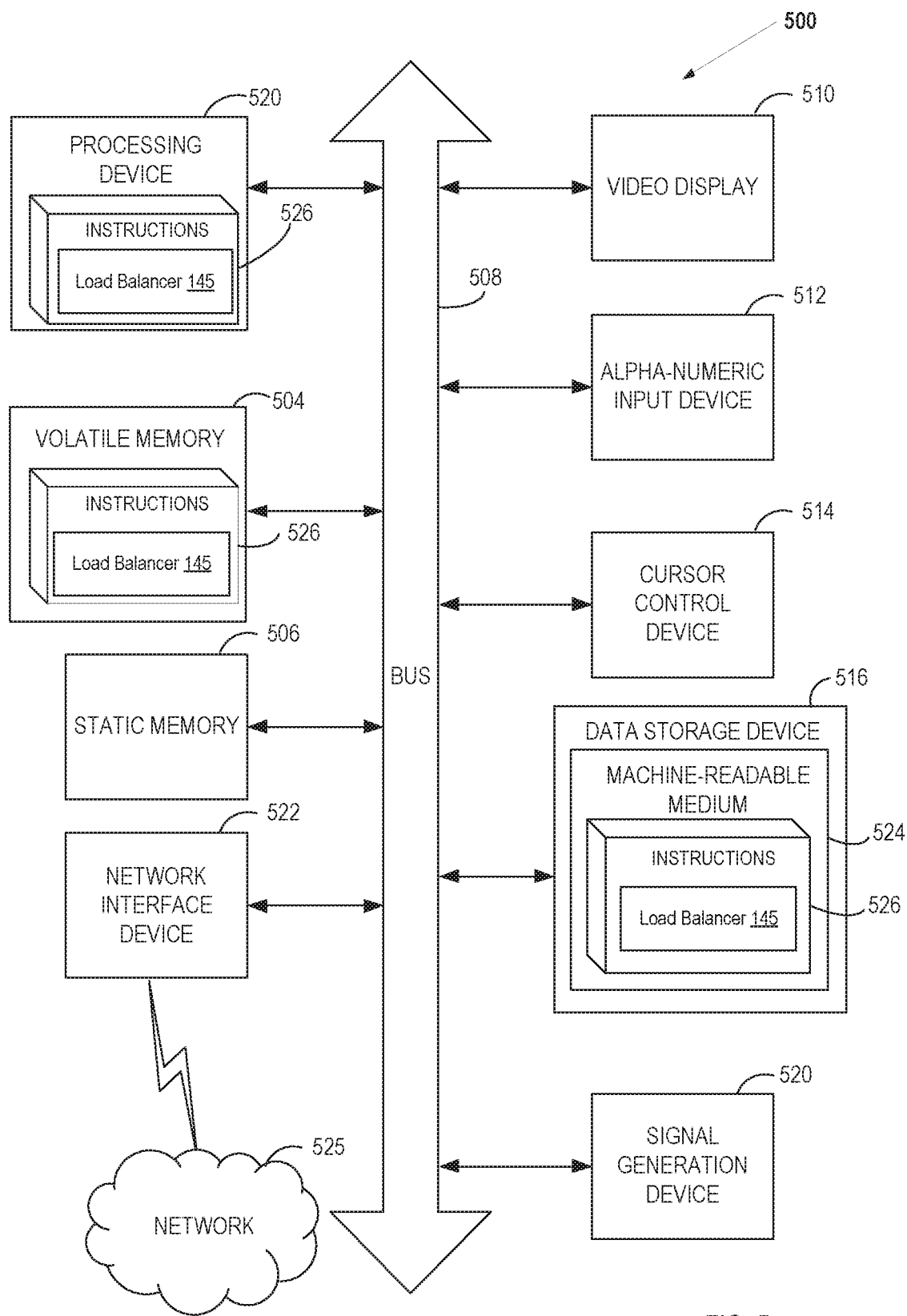
FIG. 5 illustrates a block diagram illustrating a computer system in which implementations of the disclosure may be used.

FIG. 5 illustrates a diagrammatic representation of a machine in the example form of a computer system 500 within which a set of instructions, for causing the machine to perform any one or more of the methodologies discussed herein, may be executed. In various illustrative examples, computer system 500 may correspond to the apparatus 300 of FIG. 3. In some implementations, the computer system 500 may support distributed ledgers in a micro-services environment.

The computer system 500 may be included within a data center that supports virtualization. Virtualization within a data center results in a physical system being virtualized using virtual machines (e.g., containers 151-154 of FIG. 1) to consolidate the data center infrastructure and increase operational efficiencies. A virtual machine (VM) may be a program-based emulation of computer hardware of the virtualized data center. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for supporting micro-services of a blockchain consensus system.

The computer system 500 includes a processing device 502, a main memory 504 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 516, which communicate with each other via a bus 508.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is to execute the processing logic 526 for performing the operations and steps discussed herein.

The computer system 500 may further include a network interface device 522 communicably coupled to a network 564. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

Data storage device 516 may include a computer-readable storage medium 524 (e.g., a non-transitory computer-readable storage medium) on which may store instructions 526 encoding any one or more of the methods or functions described herein, including instructions encoding the load balancer 145 of FIG. 1 for implementing method 400 of FIG. 4 for supporting micro-services of a blockchain consensus system.

Instructions 526 may also reside, completely or partially, within volatile memory 504 and/or within processing device 502 during execution thereof by computer system 600, hence, volatile memory 504 and processing device 502 may also constitute machine-readable storage media.

The non-transitory machine-readable storage medium 524 may also be used to store instructions 526 to implement a load balancer 145 ensures highly available and maximally consistent distributed ledgers in a cloud-based system, such as the PaaS system described herein, and/or a software library containing methods that call the above applications. While the machine-accessible storage medium 524 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

It is to be understood that the above description is intended to be illustrative, and not restrictive. Many other implementations are apparent upon reading and understanding the above description. The scope of the disclosure should, therefore, be determined with reference to the appended claims, along with the full scope of equivalents to which such claims are entitled.

In the above description, numerous details are set forth. It is apparent, however, that the disclosure may be practiced without these specific details. In some instances, structures and devices are shown in block diagram form, rather than in detail, in order to avoid obscuring the disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "identifying", "updating", "copying", "publishing", "selecting", "utilizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems appears as set forth in the description below. In addition, the disclosure is not described with reference to any particular programming language. It is appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. An apparatus comprising:
   a memory to store a set of blocks of a distributed ledger; and
   a processing device, operatively coupled to the memory, to:
   receive, from a node device, a message comprising a first number of blocks of the distributed ledger that have been processed by the node device;

responsive to determining that the node device has processed a most number of blocks of the distributed ledger relative to one or more other node devices, determine a number of blocks to be skipped in a queue of blocks for the distributed ledger, wherein the number of blocks to be skipped comprises a difference between the first number of blocks of the distributed ledger that have been processed by the node device and a second number of blocks of the distributed ledger that have been processed by the processing device, wherein the difference between the first number of blocks and the second number of blocks satisfies a threshold value;

utilize one or more blocks that correspond to the determined number of blocks to be skipped to update the set of blocks of the distributed ledger, wherein the one or more blocks have been processed by the node device; and skip another one or more blocks in the queue of blocks corresponding to the one or more blocks that are utilized to update the set of blocks of the distributed ledger, wherein the processing device to skip the another one or more blocks further comprises the processing device to skip generating a hash value for block data of the another one or more blocks in the queue of blocks and to continue generating a hash value for block data of one or more blocks in the queue of blocks that are subsequent to the another one or more blocks in the queue of blocks.

2. The apparatus of claim 1, wherein the processing device is further to copy the one or more blocks that correspond to the determined number of blocks to be skipped from the node device.

3. The apparatus of claim 1, wherein the processing device is further to receive a publication of a number of blocks processed by each node device of a plurality of node devices, the node device being a part of the plurality of node devices.

4. The apparatus of claim 3, wherein the processing device is further to select at least one node device of the plurality of node devices in view of the publication, wherein the selected at least one node device has processed a greater number of blocks of the distributed ledger than other node devices of the plurality of node devices.

5. The apparatus of claim 1, wherein the processing device is further to append the one or more blocks that correspond to the determined number of blocks to the set of blocks of the distributed ledger.

6. A method comprising:

receiving, from a node device, a message comprising a first number of blocks of a distributed ledger that have been processed by the node device;

responsive to determining that the node device has processed a most number of blocks of the distributed ledger relative to one or more other node devices, determining, by a processing device, a number of blocks to be skipped in a queue of blocks for the distributed ledger, wherein the number of blocks to be skipped comprises a difference between the first number of blocks of the distributed ledger that have been processed by the node device and a second number of blocks of the distributed ledger that have been processed by the processing device, wherein the difference between the first number of blocks and the second number of blocks satisfies a threshold value;

utilizing, by the processing device, one or more blocks that correspond to the determined number of blocks to be skipped to update a set of blocks of the distributed ledger, wherein the one or more blocks have been processed by the node device; and skipping, by the processing device, another one or more blocks in the queue of blocks corresponding to the one or more blocks that are utilized to update the set of blocks of the distributed ledger, wherein the skipping further comprises skipping to generate a hash value for block data of the another one or more blocks in the queue of blocks and continuing to generate a hash value for block data of one or more blocks in the queue of blocks that are subsequent to the another one or more blocks in the queue of blocks.

7. The method of claim 6, further comprising copying the one or more blocks that correspond to the determined number of blocks to be skipped from the node device.

8. The method of claim 6, further comprising receiving a publication of a number of blocks processed by each node device of a plurality of node devices, the node device being a part of the plurality of node devices.

9. The method of claim 8, further comprising selecting at least one node device of the plurality of node devices in view of the publication, wherein the selected at least one node device has processed a greater number of blocks of the distributed ledger than other node devices of the plurality of node devices.

10. The method of claim 6, further comprising appending the one or more blocks that correspond to the determined number of blocks to the set of blocks of the distributed ledger.

11. A non-transitory computer-readable storage medium comprising executable instructions that when executed, by a processing device, cause the processing device to:

receive, from a node device, a message comprising a first number of blocks of a distributed ledger that have been processed by the node device;

responsive to determining that the node device has processed a most number of blocks of the distributed ledger relative to one or more other node devices, determine, by the processing device, a number of blocks to be skipped in a queue of blocks for the distributed ledger, wherein the number of blocks to be skipped comprises a difference between the first number of blocks of the distributed ledger that have been processed by the node device and a second number of blocks of the distributed ledger that have been processed by the processing device, wherein the difference between the first number of blocks and the second number of blocks satisfies a threshold value;

utilize one or more blocks that correspond to the determined number of blocks to be skipped to update a set of blocks of the distributed ledger, wherein the one or more blocks have been processed by the node device; and skip another one or more blocks in the queue of blocks corresponding to the one or more blocks that are utilized to update the set of blocks of the distributed ledger, wherein the processing device to skip the another one or more blocks further comprises the processing device to skip generating a hash value for block data of the another one or more blocks in the queue of blocks and to continue generating a hash value for block data of one or more blocks in the queue of blocks that are subsequent to the another one or more blocks in the queue of blocks.

12. The non-transitory computer-readable storage medium of claim 11, wherein the processing device is further to copy the one or more blocks that correspond to the determined number of blocks to be skipped from the node device.

13. The non-transitory computer-readable storage medium of claim 11, wherein the processing device is further to receive a publication of a number of blocks processed by each node device of a plurality of node devices, the node device being a part of the plurality of node devices.

14. The non-transitory computer-readable storage medium of claim 13, wherein the processing device is further to select at least one node device of the plurality of node devices in view of the publication, wherein the selected at least one node device has processed a greater number of blocks of the distributed ledger than other node devices of the plurality of node devices.

15. The non-transitory computer-readable storage medium of claim 11, wherein the processing device is further to append the one or more blocks that correspond to the determined number of blocks to the set of blocks of the distributed ledger.

* * * * *